Dec. 4, 1945.　　　S. H. HUNZIKER　　　2,390,306
DISCHARGE CHUTE FOR HAY BALERS
Filed Dec. 8, 1944
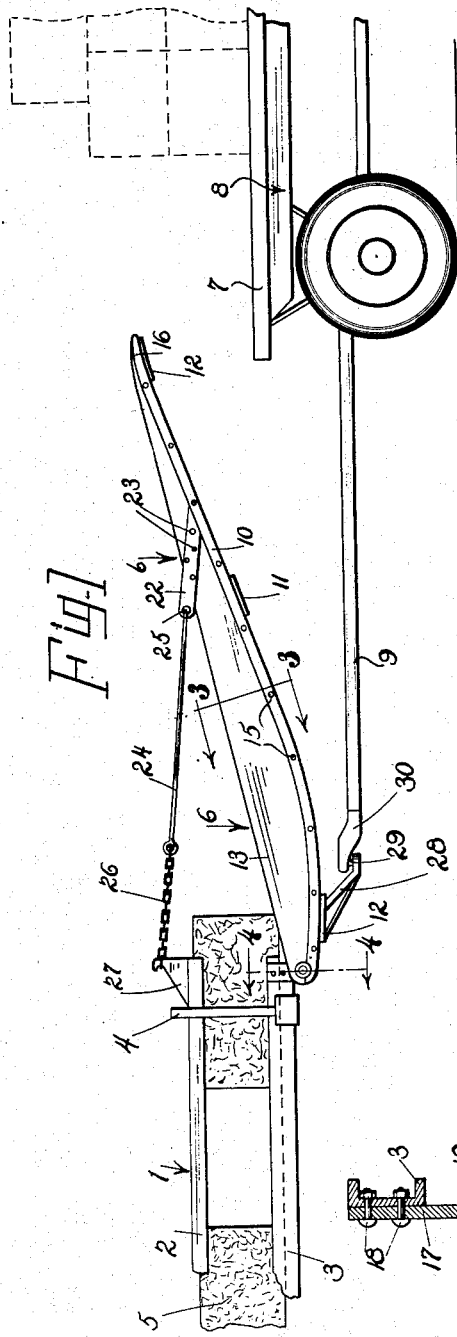
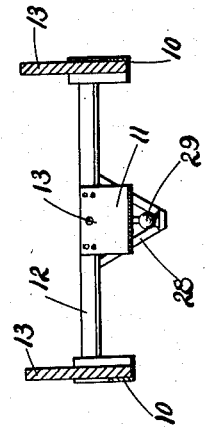
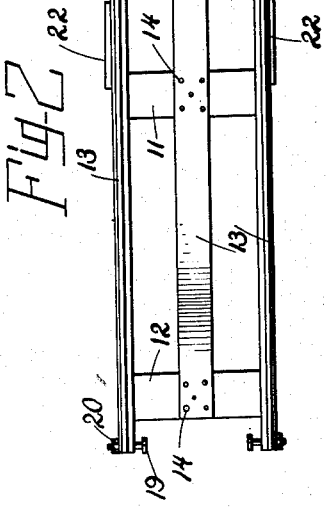
Inventor
SIDNEY H. HUNZIKER, DECEASED,
FREDA E. HUNZIKER, ADMINISTRATRIX
By Clarence A. O'Brien
and Harvey B. Jackson
Attorneys Patented Dec. 4, 1945

2,390,306

UNITED STATES PATENT OFFICE 2,390,306

DISCHARGE CHUTE FOR HAY BALERS

Sidney H. Hunziker, deceased, late of Drexel, Mo., by Freda E. Hunziker, administratrix, Drexel, Mo.

Application December 8, 1944, Serial No. 567,260

1 Claim. (Cl. 214—41)

This invention relates to improvements in discharge chutes for hay balers, the primary object in view being to equip pick-up hay balers with efficient means of simple, inexpensive construction for transferring bales of hay, or straw, from the baler to a trailing truck while the baler and truck are in motion, and which is especially adapted for embodying in standard types of pick-up hay balers without necessitating material alterations in the basic equipment of the balers.

Other and subordinate objects, also comprehended by this invention, together with the precise nature of the improvements and the advantages thereof, will become readily apparent when the succeeding description and claim are read with reference to the drawing accompanying and forming part of this specification.

In said drawing:

Figure 1 is a fragmentary view in side elevation illustrating the improved discharge chute in a preferred embodiment thereof applied to a pick-up hay baler pulling a trailer truck, Figure 2 is a view in top plan of the discharge chute detached, Figure 3 is a view in transverse section taken on the line 3—3 of Figure 1 and drawn to an enlarged scale, Figure 4 is a detail view in vertical section taken on the line 4—4 of Figure 1 and drawn to an enlarged scale.

Referring to the drawing by numerals, this invention has been shown therein as applied to a well known type of pick-up hay baler 1, conventionally illustrated as sufficient for the present purposes, and which, at its discharge end, is formed with upper and lower side frame members 2, 3 connected by uprights 4 and forming a guide frame for bales of hay, or straw, 5 discharged, under pressure, in a well known manner out of said rear end. This improved chute 6 is designed for attachment to said rear end of the baler 1 to form a bridge between said end of said baler and the bed 7 of a trailer truck 8 of the type equipped with a tongue 9.

The chute 6 is of elongated, generally rectangular form and embodies a pair of side bars 10 of angle iron form opposed with channel sides facing to form tracks for the discharge bales 5, and intermediate cross bar 11 and end bars 12 suitably connecting the bars 10 together in parallel relation, and side walls forming members 13 relatively narrower than said bars 10 and fitted in said bars 10, as best shown in Figure 3, in upstanding position. Preferably, a longitudinal reinforcing bar 13 is provided in the center of the chute and connected to said bars 11, 12, as by rivets 14. The side wall-forming members 13 may be similarly connected to the bars 10, as at 15. As will be noted, particularly in Figure 3, the cross bars 11, 12 underlie the bars 10 and the reinforcing bar 13 overlies said cross bars so that said bar 13 provides a center clear track for the bales 5. At what constitutes the front end of the chute 6, the bars 10 are bowed downwardly to obviate an abrupt rise at the discharge end of the baler 1 and obstruction to passage of the bales 5 into said chute, and the lower edges of said members 13 are correspondingly curved. Preferably, the side wall-forming members 13 taper edgewise to the rear end of the chute 6 and the bars 10 at said rear end are downwardly curved, as at 16, with the end cross bar 12 correspondingly shaped to reduce frictional resistance to discharge of bales 5 out of said chute.

For attaching the chute 6 to the baler 1, a pair of hanger bars, one of which is shown at 17, are bolted, as at 18, to the lower side members 3 of said baler 1 at the discharge end of said baler to depend below said members 3. At the front end of the chute 6, bolts, as at 19, are extended through the front ends of the bars 10 and said members 13 and through the lower ends of said hanger bars 17 with nuts 20 thereon, said bolts 19 forming pivots whereby the chute is vertically swingable on said hanger bars 17. Preferably bushings, as at 21, are provided around the bolts 19 and in said bars 10 and members 13 to obviate wear in said bars 10 and members 13. A pair of opposed strap iron bars 22 are riveted to the side wall-forming members 13, as at 23, intermediate the ends of the chute 6 and to each of which a rod 24 is pivoted, as at 25, at one end of the rod, the other end of the rod being provided with a chain 26 adapted to be hooked over a hook plate 27 suitably attached to the appropriate upper frame member 2 of the baler 1 in upstanding position. As will be seen, the chains 26 are attached to the hook plates 27 so that the chute 6 inclines upwardly and rearwardly from the baler 1 and the angle of inclination of the chute 6 may be varied by attaching different links of the chains 26 to said hook plates 27.

A coupling bracket 28 inclines downwardly and rearwardly from the cross bar 12 at the front end of the chute 6 and is provided with an upstanding coupling pin 29 over which a suitable coupling sleeve 30 on the front end of the tongue 9 is adapted to be disposed. Said cross bar 12, it will be noted, is disposed in the rear of the pivot bolts 19. This, together with the described arrangement of the coupling bracket 28, provides for the drag of the trailer truck 8 functioning to maintain the chute 6 in an upwardly and rearwardly inclined position, thereby taking the strain incident to the weight of the bale 5 passing through the chute 6 off the rods 20, chain 26 and hook plates 27. As will be understood, the chute 6 is of the proper length to dispose the rear end thereof over the front end of the bed 7 of the trailer truck 8.

The manner in which the described invention functions will be readily understood. As the bales 5 are discharged from the baler 1, said bales are pushed through the chute 6 for unloading onto the bed 7 of the trailer truck 8. When the baler 1 and trailer truck 8 are in motion, the drag of said truck tends to swing the chute 6 upwardly and relieve the rods 24, chains 26 and hook plates 27 of extra load resulting from the weight of the bales 5 on the chute 6.

The foregoing will, it is believed, suffice to impart a clear understanding of this invention without further explanation.

Manifestly, the invention, as described, is susceptible of modification without departing from the inventive concept, and right is herein reserved to such modifications as fall within the scope of the appended claim.

What is claimed is:

In combination, a tow vehicle, a trailer vehicle, a discharge chute extending from the rear end of the tow vehicle over the front end of the trailer vehicle and having a front end pivotally mounted on said rear end below the same whereby said chute is vertically swingable into upwardly and rearwardly inclined position, flexible means for sustaining said chute in said position against sagging, and means to couple said trailer vehicle to the bottom of said chute in the rear of the axis of swinging movement thereof and below said axis whereby the drag of said trailer vehicle will tend to swing the chute upwardly.

FREDA E. HUNZIKER,
*Administratrix of the Estate of Sidney H. Hunziker, Deceased.*